United States Patent
Davidov

(10) Patent No.: US 6,870,346 B2
(45) Date of Patent: Mar. 22, 2005

(54) METHOD AND APPARATUS FOR CONTROLLING ACCELERATION AND VELOCITY OF A STEPPER MOTOR

(75) Inventor: Vladimir Nikolayevich Davidov, St. Petersburg (RU)

(73) Assignee: Acuid Corporation (Guernsey) Limited, Guernsey (GB)

( * ) Notice: Subject to any disclaimer, the term of this patent is extended or adjusted under 35 U.S.C. 154(b) by 123 days.

(21) Appl. No.: 10/367,017

(22) Filed: Feb. 14, 2003

(65) Prior Publication Data

US 2003/0137273 A1 Jul. 24, 2003

Related U.S. Application Data

(63) Continuation-in-part of application No. PCT/RU00/00339, filed on Aug. 15, 2000.

(51) Int. Cl.[7] .............................................. G05B 19/40
(52) U.S. Cl. ........................ 318/685; 318/696; 318/608; 318/632
(58) Field of Search ................................. 318/685, 696, 318/608, 632, 254, 138, 439

(56) References Cited

U.S. PATENT DOCUMENTS

| | | | | |
|---|---|---|---|---|
| 3,809,990 A | * | 5/1974 | Kuo et al. | 318/696 |
| 4,618,808 A | | 10/1986 | Ish-Shalom et al. | 318/696 |
| 4,631,657 A | * | 12/1986 | Hill et al. | 700/63 |
| 5,204,601 A | * | 4/1993 | Hirata et al. | 318/606 |
| 5,619,085 A | | 4/1997 | Shramo | 310/184 |
| 5,663,624 A | | 9/1997 | Callaway | 318/696 |
| 6,121,745 A | * | 9/2000 | Komm | 318/696 |
| 6,194,863 B1 | * | 2/2001 | Mainberger | 318/696 |

* cited by examiner

Primary Examiner—Rina Duda

(57) ABSTRACT

A method and apparatus for controlling acceleration and velocity of a stepper motor in which a phase offset is selected depending on motor velocity. The optimal phase offset indicates the position of the winding which generates the maximal driving moment. The increase of the driving force and the extension of the range of steady-state movement is achieved for advanced motor coils commutation with constant frequency using velocity feed back and gradual step-wise phase shift where the phase offset is selected depending on rotor velocity. The invention may be effectively applied to servomotors, stepper motors, motors having certain limitations on movement parameters, such as limitations on acceleration and other types of motors.

22 Claims, 5 Drawing Sheets

METHOD AND APPARATUS FOR CONTROLLING ACCELERATION AND VELOCITY OF A STEPPER MOTOR

BACKGROUND OF THE INVENTION

The present invention relates to methods and apparatus for controlling acceleration and velocity of a stepper motor and more particularly to such methods and apparatus in which the stepper motor switching angle varies.

Stepper motors transfers with high accuracy digital electrical signals directly into discreet angle movements (steps) of a rotor. Stepper motors are synchronous motors in which rotor's positions depends directly on driving signal. Rotary moment is defined by magnetic energy and is proportional to the tooth number of the rotor.

Most stepper motors are operated in an open-loop configuration. Given a known and fixed load driven by the stepper motor, a commutation (step) sequence can be developed by a person having ordinary skill in the art which accelerates the load to a desired velocity without a loss of steps. In other words, each time the motor is commutated, the rotor is in a position in which torque generated by the electrical field advances the rotor until it is appropriately positioned for the next commutation, and so forth. In such open-loop configurations, if the load is different than that for which the commutation sequence was developed, steps can be lost to the extent that the rotor may not rotate at all.

Closed-loop configurations use feedback to sense rotor position via a conventional shaft encoder. The rotor position information may be utilized to produce each motor commutation. Most such configurations employ a fixed switching angle commutation. In other words, the motor is commutated each time the rotor advances through a predetermined angle. While the motor does not lose steps with this method, it cannot achieve a precise target velocity due to uncontrollable variance in parameters such as motor supply voltage, friction, etc. Also, if the load is different than that for which the commutation switching-angle was chosen, the stepper motor may run at a velocity very different from the desired velocity. Moreover, when a desired velocity is selected, the corresponding switching angle typically cannot be calculated with precision.

One more technique is driving the motor by supplying currents that are sequentially phase shifted. In this case, the rotary moment is less oscillating.

The rate with which current changes significantly affects dynamic characteristics of the motor. Different techniques has been known that provides the increase in current build-up in motor coils, among which are:
  introduction of the additional resistance which reduces the time constant of current. The increase of the maximal current in a loop is compensated by the increase in the driving voltage. The drawback of this technique is electrical power loss in the resistor;
  electrical damping by spooling an additional coil together with the main coil. In this case, the additional coil is coupled with the main one and its time constant can be controlled by an external resistance. Such closed-loop winding acts only during the transitional periods thus reducing substantially time constant. The drawbacks of the method is power reduction and increase in motor' moment of inertia;
  high-voltage feeding of a winding until the required current appears. The drawback is increase in power loss and the complexity of driving circuitry.

The foregoing prior art stepper motor systems will not accurately control the velocity and position of a load during the acceleration and deceleration periods and experience substantial power losses and temperature increase which imposes limitations on operation characteristics of the motor.

BRIEF SUMMARY OF THE INVENTION

The present invention comprises a method and apparatus for controlling a stepper motor having a driven rotor.

A general object of the present invention is to provide a method and apparatus for controlling velocity and acceleration and deceleration of a stepper motor which overcomes the above-enumerated disadvantages associated with prior art methods and apparatus.

It is another object of the present invention to provide such a method and apparatus which has improved start-stop velocity control.

It is another object of the present invention to provide such a method and apparatus which has similar operating characteristics to a DC servomotor with substantially less expense.

Typically, when motor coils are commutated according to the motor shaft position, the maximal phase offset shall not exceed half-period and is preferably selected much less because when the phase offset advances more than a half of a period, the shaft may rotate oppositely. The maximal steady-state velocity for this control mode does not exceed 10,000 half steps per second.

However, according to the present invention, surprisingly, it has been found experimentally that the maximal motor shaft velocity can be much more than 10,000 half steps per second. In the proposed invention, the increase of the driving force and the extension of the range of steady-state movement has been achieved for advanced motor coils commutation with constant frequency using velocity feed back and gradual step-wise phase shifting where the phase offset is selected depending on rotor velocity.

Additionally, it has been found that current build-up has a significant impact on dynamic properties of a motor. Example embodiments of the invention includes powering schemes which provides increase in current build-up in the motor coils.

These and other objects and advantages of the present invention will become more fully apparent when the following detailed description is read in view of the accompanying drawings.

DETAILED DESCRIPTION OF THE INVENTION

Figure 1:
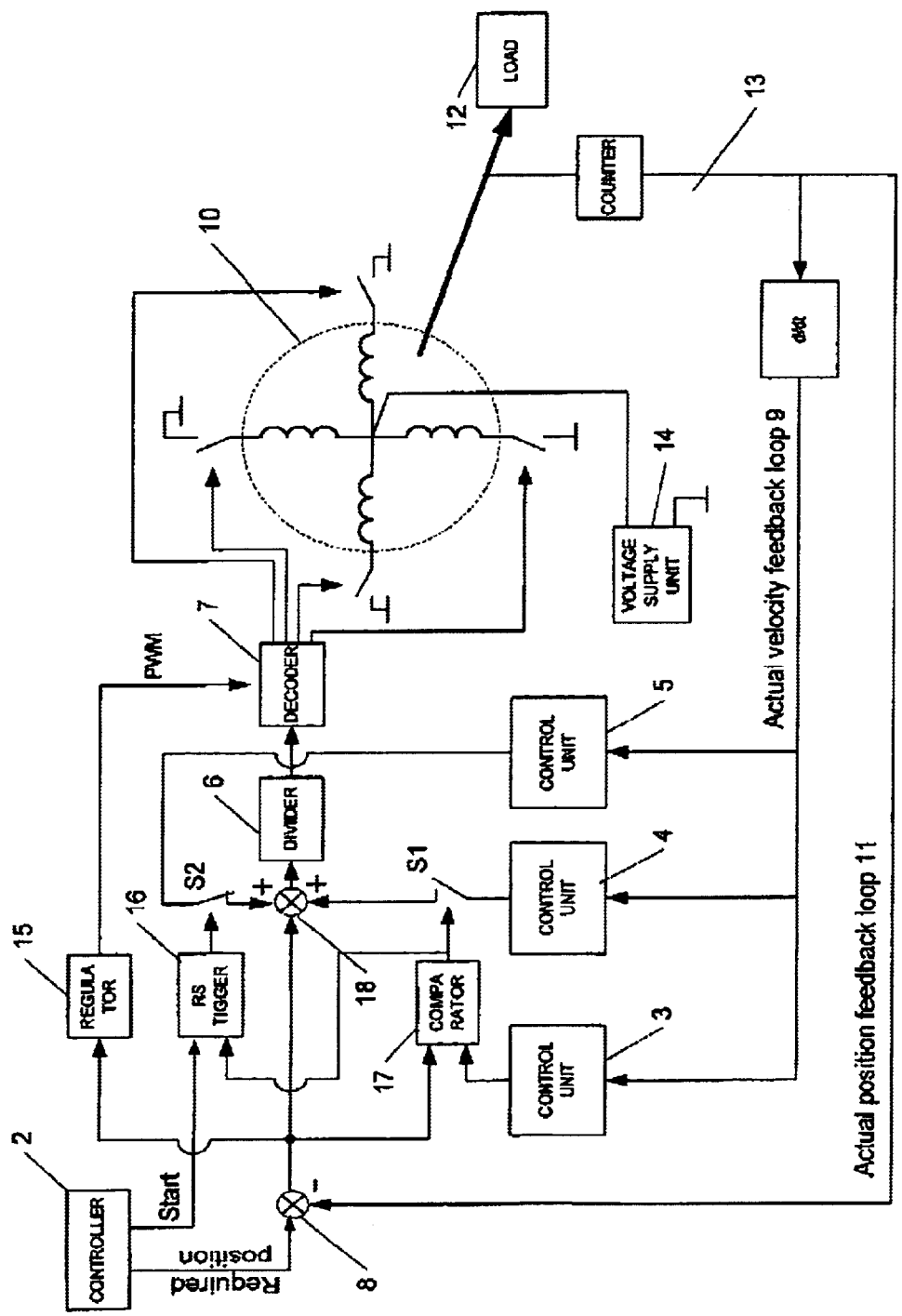
FIG. 1 is a schematic diagram of a stepper motor control system according to the present invention.

FIG. 1 illustrates a stepper motor control circuit constructed in accordance with the present invention. A stepper motor 10 is connected to a load 12. The stepper motor 10 control circuit includes a computer/controller 2, comparators 8 17 for comparing the expected and actual sensor data, summator 18, divider 6 for providing a count representative of a desired position of the shaft of the motor, decoder 7 for determining the current phase to be energised and a conventional circuitry including regulator 15, RS trigger 16, switches S2 and S1, and voltage supply unit 14. All the above mentioned comparators and summators may be implemented as conventional FPGA (field programmable gate arrays) which may be easily selected by a specialist in the art from electronic components available in the market. In the present example, stepper motor 10 is a 4-phase hybrid stepper motor, such as characterised in Table 1.

TABLE 1

Stepper motor example characteristics

| Rated voltage | V | 12 |
|---|---|---|
| Rated current | A | 0.6 |
| Resistance | Ohm | 20 |
| Inductance | _mMH | 32 |
| Detent torque | _mNm | 30 |
| Holding torque | _mNm | 500 |
| Step angle accuracy | % | 5 |
| Step | Degree of arc | 1.8 |
| Max. pull-in speed under supply voltage 36 V | Hz (full step) | 900 |
| | Hz (half step) | 1900 |

It shall be appreciated, however, that the present invention is not limited by the above example embodiment stepper motor, but applicable also to other types of polyphase motors, including linear stepper motors.

The control circuit further comprises a position feedback loop 11 and velocity feedback loop 9. The feedback loops are used to adjust the performance of the stepper motor using the information provided by a counter 13 connected to the shaft of stepper motor 10.

Counter 13 is a conventional incremental optical encoder which provides wave output, such as described in U.S. Pat. No. 5,663,624. This counter provides both data on increment of rotation and direction of rotation. In the present example, the number of counts per revolution is 2,000, while stepper motor 10 has 50 commutations (in half steps) per revolution, thus the number of counts per commutation (or, the period of commutation of coils) equals 40 (2000/50).

A typical 4-phase stepper motor is driven by a stepper motor drive circuit, such as described in U.S. Pat. No. 5,663,624 which comprises a controller implemented by a microprocessor, a clock drive, and a counter incremented by one for each periodic clock signal. Each time a step signal appears on an output terminal of the controller, the stepper motor is commutated.

The 4 phases of the stepper motor are energized in accordance with a predetermined commutation sequence by virtue of the switching action of the transistor associated with each phase. Such driving produces rotation of the rotor and shaft of the stepper motor. The shaft is connected to a load which may be constant or variable in time, such as for example, an ink jet cartridge in a printer, or a semiconductor device carriage in a memory tester.

Typically, an angle counter is connected to the shaft of the stepper motor, such as a conventional 2-channel incremental optical counter which provides two square wave output channels in quadrature relationship. Position information is decoded by detecting the transitions from high to low of each channel and the level of the other channel. Such information provides both increment of rotation and direction of rotation. Such encoders always generate an integer number of "counts" per revolution. The number of encoder counts per revolution is N, in the present embodiment of the invention, N is 2000.

A position generator stores a count representing of the desired or ideal motor shaft position which increments or decrements by an amount equal to the number of counts per motor commutation each time a step signal is generated on the output terminal. As the present stepper motor has 50 commutations (in half steps) per revolution, the number of counts per commutation equals 2000/50=40. This parameter is defined as the counter period.

Figure 2A:
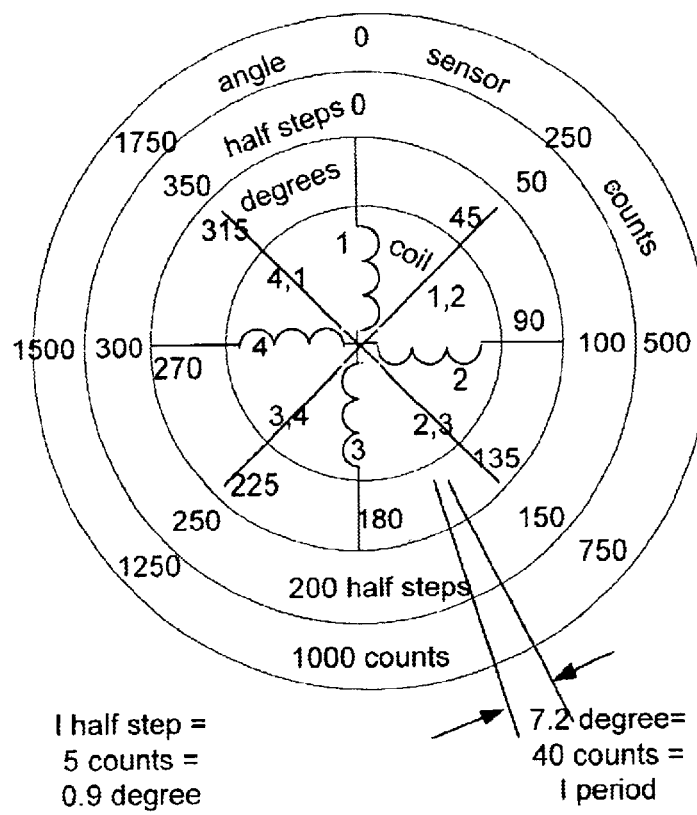
FIG. 2a illustrates the ratio between half steps, angle degrees and counts of an angular counter for the present example embodiment of a stepper motor.
Figure 2B:
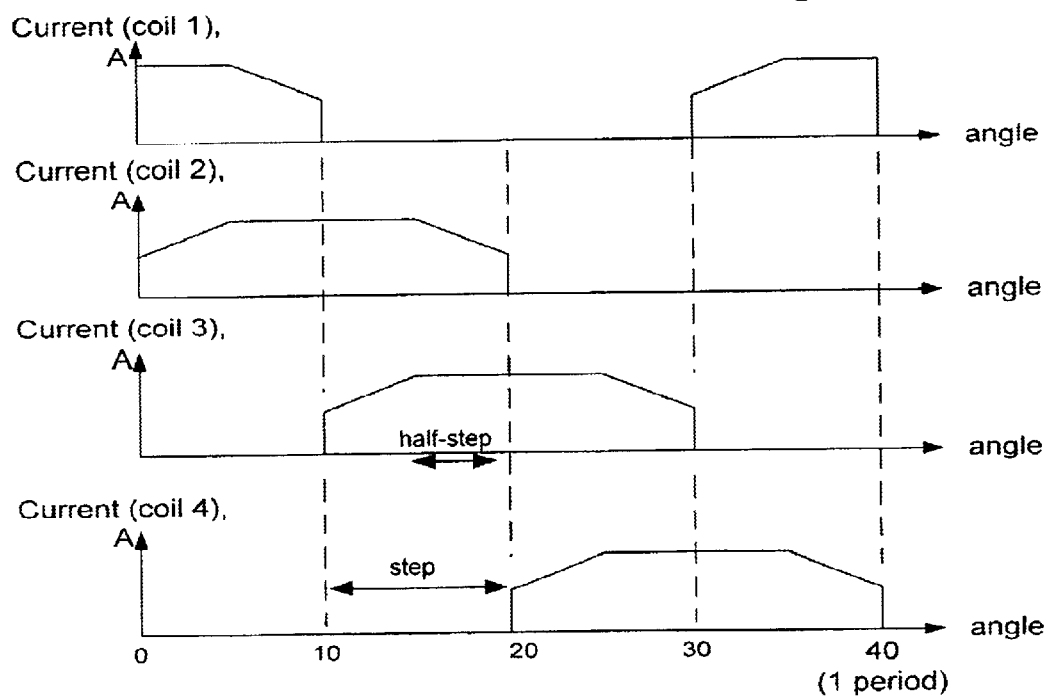
FIG. 2b illustrates sequential energizing of motor coils with enhanced accuracy according to the present invention.

In FIG. 2(a) an explanation scheme is presented showing the ratio between counts of the counter, degrees of arc and half-steps of a stepper motor for the present example stepper motor driving circuit. FIG. 2(b) illustrates how the coils are commutated in half-steps, i.e. with overlapping.

Now, a motor sequencing will be explained in detail. A signal of constant frequency is received from the controller 2 and connected via summators 8 and 18 to the input of a programmable divider 6. From the output of divider 6, pulses, optionally modulated by PWM, are provided for a stepper motor.

According to the invention, a motor is accelerated by advanced powering of shift windings, wherein phase advance is selected depending on rotation velocity. The angle of phase advance (or, the phase shift, for the purpose of calculating which winding shall be commutated next) is selected with regard to the motor velocity so as the selected phase shift indicates on a winding, or windings, which generate the maximal driving moment at a given velocity.

Figure 3A:
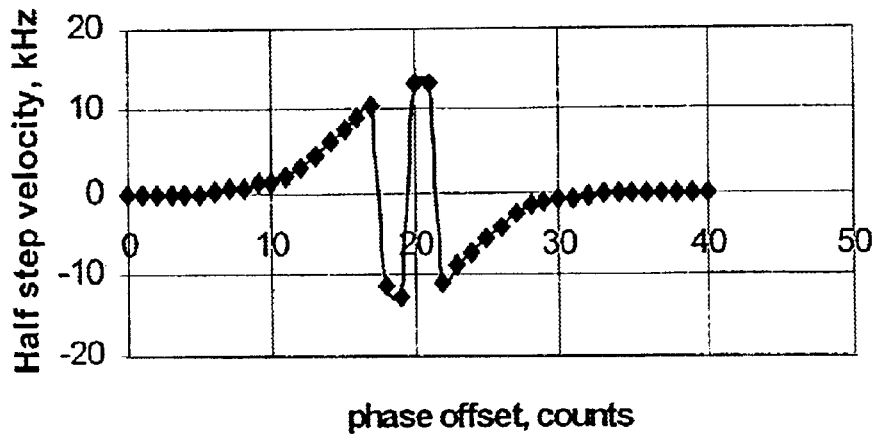
FIG. 3a shows half step velocity dependence on phase shift when motor coils are commutated according to shaft position, wherein each velocity value is obtained after the motor is fully stopped.

In FIG. 3a an example is given of a velocity dependence on phase shift when motor coils are commutated according to the motor shaft position as in most prior art methods, for a voltage of 12 V. For each measurement, the motor was accelerated starting from zero velocity. As may be seen in the figure, to provide a steady-state movement, the maximal phase shift (or, offset) shall not exceed 17/40 of a phase period. In the proximity of half-period, i.e. in the range from 17 to 23 counts, the rotation is unstable. The maximal steady-state velocity in this case is equal to 10,000 half steps per second.

Figure 3B:
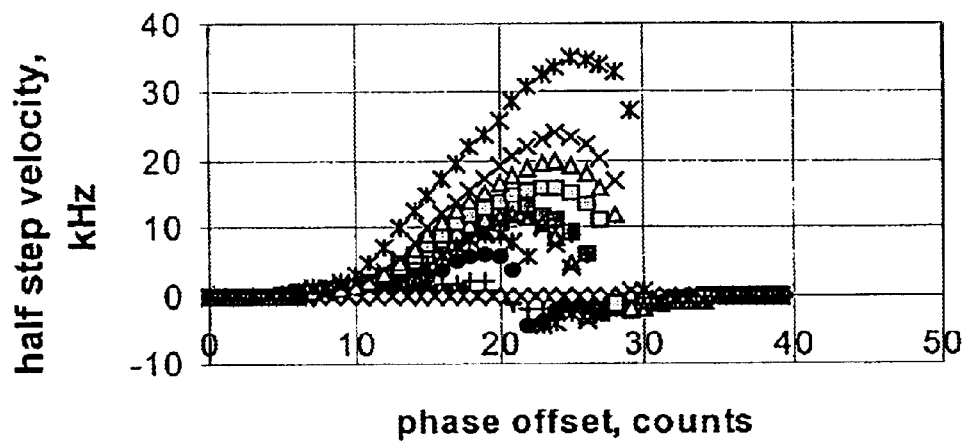
FIG. 3b shows half step velocity dependence on phase shift when motor coils are commutated at a gradual change of phase shift, for voltages in the range from 8 V to 30 V.
Figure 5A:
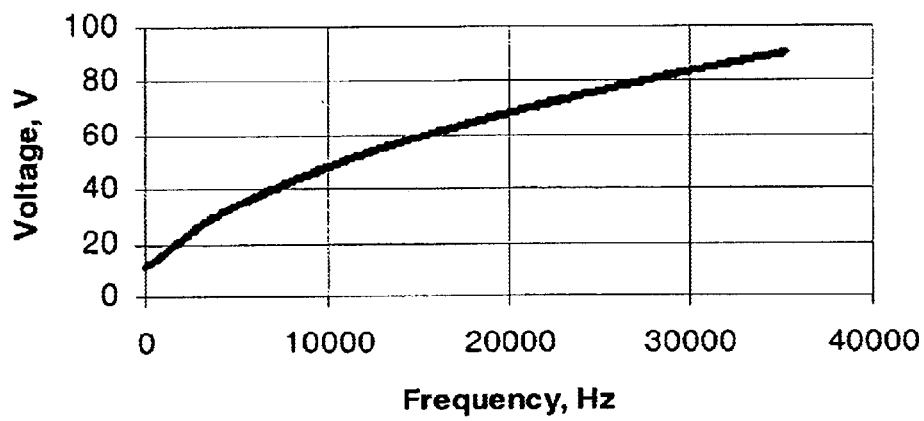
FIG. 5a shows how the power is increased as the frequency grows according to the present invention.
Figure 5B:
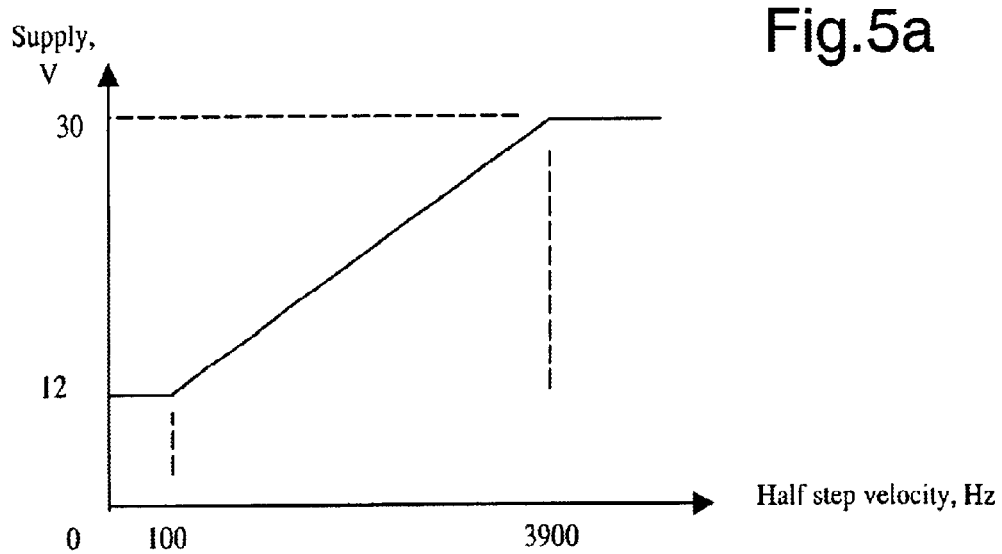
FIG. 5b illustrates how the supply shall be increased as the velocity grows.
Figure 5C:
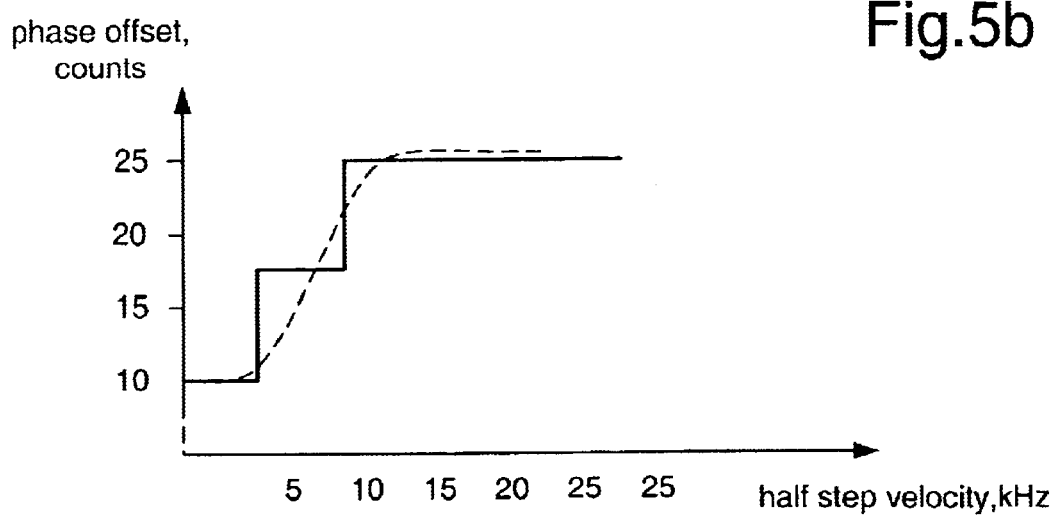
FIG. 5c illustrates how the phase offset shall be increased as the velocity grows.

According to the present invention, it has been found experimentally that the phase shift may be increased gradually or step-wise as shown in FIG. 5c, after the velocity reaches a predetermined value, the value of phase shift rising as high as up to 27/40 of a period, i.e. more than half of a period. In this case the motor shaft velocity can exceed 10,000 half steps per second at the same voltage supply of 12V as illustrated in FIG. 3b. It is also shown in the figure that for different voltages different values of phase offset provide dramatic increase in motor velocity.

Referring now back to FIG. 1, the method of controlling motor velocity according to the present invention will be described in detail.

Controller 2, such as a control logic, outputs a "start" signal which causes the stepper motor to be commutated, and a "required position" signal which provides a count corresponding to the required position of the motor shaft. A "required position" generator is a register which stores a count representing of the desired or ideal motor shaft position. Position generator increments or decrements by an amount equal to the number of counts per motor commutation each time a "Start" signal is generated.

The counter 13 provides a count representative of the actual position of the shaft of motor 10 while the controller 2 provides a count equal to the position at which the shaft will be when the current step is complete. The error is thus equal to count required minus count actual. The error parameter is a control variable produced by summator 8 and applied to comparator 17. As will later be described in connection with the operation of the control circuit, error is automatically calculated during the operation of the control system. Similarly, the actual velocity data calculated as $\Delta/\Delta t$ is supplied by counter 13 to deceleration unit 3 which produces a reference count representative of the optimal deceleration value which is supplied to comparator 17. Thus, the value appearing on the output of comparator 17 equals to error minus reference count.

The signal "start" sets RS trigger 16 (alternatively, a latch or a flip-flop may be used for this purpose), which closes switch S2, thereby a reference phase offset optimal for acceleration is fed to the input of summator 18. The sum of the error signal and acceleration phase offset from the output of summator 18 is fed to divider 6 which determines motor coils to be commutated by calculating the excess of the period of commutation for an input signal. The calculated excess is supplied to decoder 7 which energizes the respective motor coils. As a result, a magnetic force $F_{motor}$ proportional to the current strength in the coil moves load 12 against the resistance force of the load, $F_{load}$.

The counter 13 determines the actual position and velocity of the motor shaft which is representative also of the actual position and velocity of load 12. The obtained data on the shaft position is supplied to comparator 8 via feed back loop 11. The obtained shaft velocity fed via velocity feedback loop 9 is supplied to "deceleration" control unit 3, acceleration phase offset control unit 4 and deceleration phase offset control unit 5. Thereby, the stepper motor performance is adjusted for changes of the load.

Deceleration control unit 3 is typically represented in the form of a table, which may be implemented in FPGA, or in the external memory in which the data obtained during the experimental tracing of the motor characteristics are recorded. For each current velocity data received by deceleration control unit 3, it provides a respective optimal (reference) deceleration value. This optimal (reference) value is compared by comparator 17 with the error signal from comparator 8.

If error signal is less than the optimal (reference) deceleration value, comparator 17 opens switch S1 and resets RS trigger, which in turn opens switch S2 and thereby disables phase offset control unit 4 for, the whole period of deceleration. The opening of switch S1 results in resetting the phase offset unit 4 and effective deceleration.

When error signal again exceeds the optimal (reference) deceleration value for a current velocity, comparator 17 closes switch S1, and a respective phase offset value corresponding to the deceleration area is inputted into summator 18. The above described relay mode for enabling/disabling deceleration phase offset unit 4 is maintained for the whole period of deceleration until the motor is completely stopped.

A signal from divider 6 is applied to a conventional drive circuit comprising a decoder 7 powered by a PW Modulator. Decoder 7 includes logic which generates a digital output on lines A, B, C, D, which are connected to a conventional 4-phase stepper motor 10.

The present invention provides augmenting a stepper motor by advanced energizing of motor coils, wherein the advance value (e.g., phase offset) is proportional to or set depending on the motor velocity.

Figure 3C:
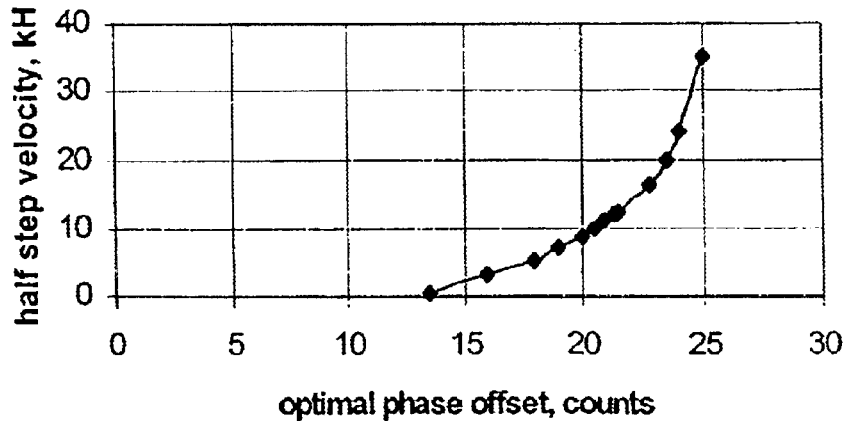
FIG. 3c illustrates how the half step velocity depends on the optimal phase shift when motor coils are commutated at a gradual change of phase shift.

For each driving voltage, different optimal and initial phase offset values exist. The optimal phase offset is defined as the phase offset providing the maximum velocity of movement at a gradual or step-wise change of phase (as shown in FIGS. 3b, 3c).

The initial phase offset provides the maximal steady-state velocity when the coils are commutated according to shaft position (as shown in FIG. 3a). The motor starts at initial phase offset. If the maximal phase offset shall be equal to the initial phase offset, the phase offset is maintained constant during the whole startup period. If the desired maximal phase offset exceeds the initial value, the switching of the phase occurs at a moment when the velocity exceeds the initial velocity. The initial velocity is equal to a steady-state velocity when the phase offset indicating on the position of coil producing the maximal driving moment at a minimum velocity is constant (see FIG. 3b). In the present example, for a 4-phase hybrid stepper motor as described above, the initial velocity is determined at a phase offset equal to ¼ of a period, wherein the period is 40 units of an angular counter (see explanation FIGS. 2a, 2b). Thus, at a voltage of 12V for a motor as presented in Table 1, the initial phase offset is equal to 17 counts, the optimal phase offset is equal to 21 counts (see FIG. 3b, FIG. 3c), commutation rate being 1400 half steps at a phase offset of 10 counts; while at a voltage of 30V, the initial and optimal phase offsets are, respectively, 17 and 24 counts, while the switching rate is 2900 Hz.

According to the present invention, a stepper motor velocity may be controlled also by varying current using regulator 15 of the apparatus shown in FIG. 1. A combination of current control and phase offset control may be used as well. The velocity and acceleration of a stepper motor may be also varied within the proposed limits by using conventional type regulators, such as PID (Proportional Integral Differential), PI (Proportional Integral) and others.

Figure 4A:
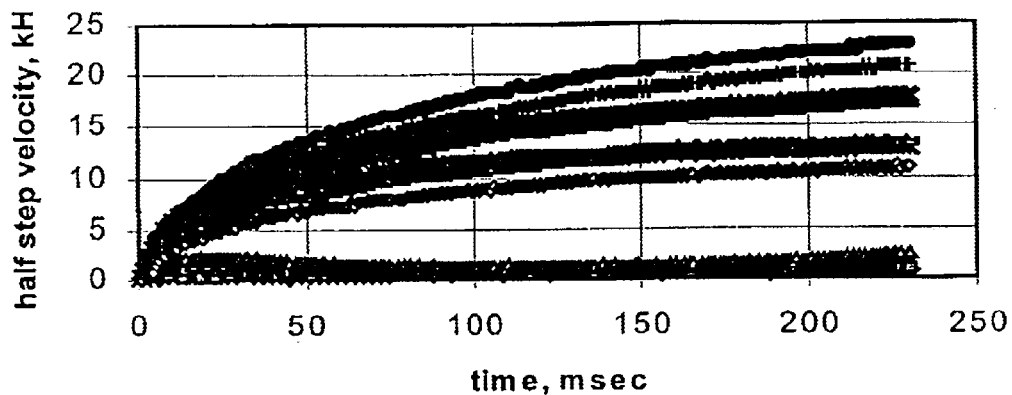
FIG. 4a illustrates the experimental acceleration profiles for different voltages and phase offsets according to the present invention.
Figure 4B:
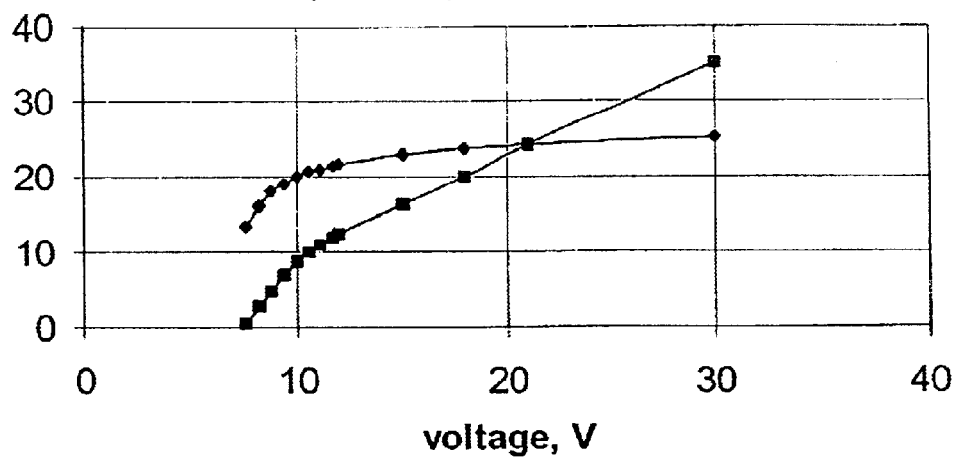
FIG. 4b shows the interrelation between the maximum half step velocity, optimal phase offset and voltage for the present stepper motor.

According to the present invention, a method of accelerating a stepper motor is proposed according to which acceleration profiles are first obtained experimentally, for example, as shown in FIG. 4a for different driving voltages and phase offset values to determine the optimal phase offset (in this case, advance) defined as the phase offset providing acceleration for the minimal period of time, and then the motor coils are advanced with the optimal phase offset for a given voltage.

TABLE 2

Motor speed-up characteristics

| Experiment | Voltage, V | Phase offset, angle units (period = 40 units) | Half step velocity (230 msec), KHz |
|---|---|---|---|
| 1 | 30 | 5 | 0.7 |
| 2 | 30 | 7 | 0.9 |
| 3 | 30 | 10 | 2.4 |
| 4 | 30 | 13 | 12.9 |
| 5 | 30 | 15 | 17.6 |
| 6 | 30 | 18 | 22.9 |
| 7 | 25 | 18 | 20.7 |
| 8 | 20 | 18 | 17.1 |
| 9 | 15 | 18 | 13.1 |
| 10 | 12 | 18 | 10.9 |

Figure 4C:
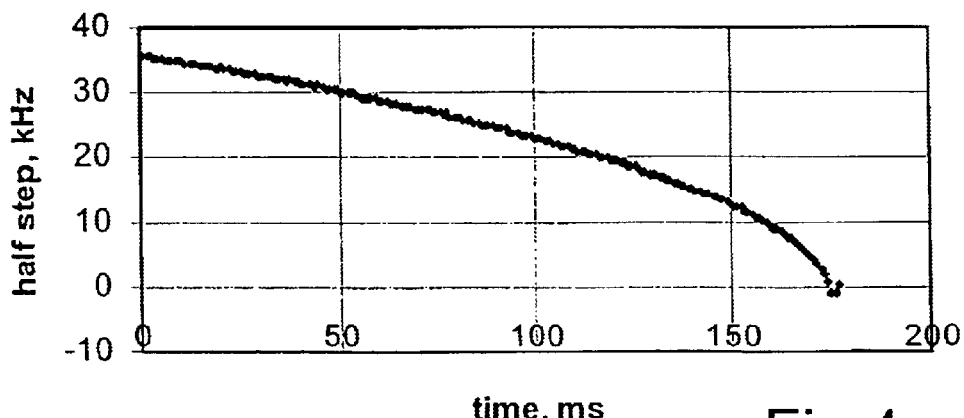
FIG. 4c illustrates the experimental deceleration profile and relay zero overshoot response mode for the stepper motor according to the present invention.

According to the present invention, a method of decelerating a stepper motor is proposed according to which deceleration profiles are first obtained experimentally, e.g. as shown in FIG. 4c.

The motor is decelerated for a minimal time by exploiting a relay mode to slide along the curve of optimal deceleration. The deceleration curve is formed after the motor is accelerated up to the maximal velocity. The initial damping moment is defined as the moment when the phase offset is set zero. Thus, the phase offset is nullified while the current coils are energised to create the maximal braking moment. An example of the optimal deceleration curve is shown in FIG. 4c.

The optimal deceleration way is obtained by integrating velocity values as presented in FIG. 4c. During the system's movement from one point of the curve to another in a real time, the current velocity and the distance from the actual position to the required position (position error) are determined. In case the position error is higher than the braking distance for a current velocity, the phase offset is nullified, in case an error is less than the braking distance, the phase offset is set at a desired level.

The phase offset value is set depending on a given velocity. The phase offset shall be selected slightly higher than the experimental value for the same velocity as shown in graph of FIG. 3a. At the same time, the phase value excess shall be minimal so that the current phase offset during braking shall be less than the phase offset corresponding to reverse movement, to exclude the possible reverse. The minimal phase offset shall correspond to a steady-state movement at a minimal velocity.

According to the present invention, it has been found that velocity and power of a stepper motor can be enhanced by increasing the driving voltage when the frequency increases in the absence of undesirable growth in working temperature.

As is well-known in the art, the maximal value of rated voltage is limited by the working temperature of a motor and temperature coefficient. Typically, to avoid the excess heating of a motor, a temperature feed back is used.

According to the proposed scheme, the motor power and velocity characteristics can be enhanced greatly without significant power losses in accordance with any one of the following techniques:

by conventional methods, e.g. using build-up of current in motor coils;
by increasing the driving voltage as the frequency grows;
by using the more powerful motor.

Referring now to theory observations, it shall be noted that the power losses in motors are determined as $P=U^2/(R+j\omega L)$;

where U is a driving voltage;
R is coil resistance;
$\omega$ is frequency;
j is imaginary unit;
L is motor inductance.

As is evident from the formula shown above, power losses are increased with the growth of voltage. However, according to the present invention, it has been proposed to increase the frequency as the voltage increases so as to reduce the total losses.

In this case, the dependence of voltage on commutation rate is calculated based on the ratio $P \leq P_m$ so that the losses do not exceed $P_m = U_n^2/R$, where $U_n$ is the rated voltage.

FIG. 5a illustrates how a feeding voltage shall be increased as the frequency rises while power losses are maintained for the present example embodiment of a stepper motor. At a quiescent position, the feeding voltage is equal to the rated voltage, while the feeding voltage is increased as the motor velocity grows.

A conventional Pulse Wide Modulator such as described for example, in U.S. Pat. No. 5,889,379 (referred to as a PWM unit hereinafter) which is connected to decoder 7, and the frequency and duty of which can be set, generates coded signals for driving stepping motor. According to this technique, a pulse duration is variable. In the apparatus shown in FIG. 1, the pulse duration can be varied by closing switches corresponding to predetermined motor coils.

The maximal voltage is limited as shown in FIG. 5b, by the maximal source voltage, and also by the breakdown voltage of switches, windings, and other circuitry elements.

According to the present invention, the power and motor velocity at a constant load may be increased while keeping the losses at the same level as well by selecting the more powerful motor. It shall be also mentioned that in the absence of feedback proposed in the present invention, the losses are significantly increased and the velocity is not enhanced.

The proposed control method provides the extended power and velocity ranges for a stepper motor. In the extended ranges, the motor can be controlled by varying current in motor coils, the same as for the DC motor. The current may be varied, e.g. by PWM of a feeding voltage.

To provide movement at predetermined parameters, regulator 15 shown in FIG. 1 is operated as follows. The regulator calculates current parameters of the motor and modulates the motor current accordingly. To calculate the parameters the motor characteristics shall be entered such as the motor gain, or dependence of a steady-state velocity on feeding voltage as presented in FIG. 3a.

The proposed control method and apparatus shown in FIG. 1 may be effectively applied to different motor techniques including servomotor, movement with optimal or predetermined constant parameters such as velocity and acceleration parameters, or when certain limitations applied, such as limitations on acceleration, etc.

The enhancement of positioning accuracy and resolving power of the proposed control method and apparatus may be achieved by conventional methods, such as sliding energizing of coils as shown in FIG. 2b. The required current values in the coils of a 4-phase stepper motor is provided by employing two PWM transformers controlling the respective switches energizing the stepper motor as shown in FIG. 1. Using the powering scheme shown in FIG. 2b provides the positioning accuracy of 1/10 of a step, i.e. 0.18 degrees. Further improvement of the accuracy may be achieved when using the more precise angle counter. The above control method provides also the smooth movement at a low velocity comparing to step-wise or half-step-wise powering schemes.

The above proposed apparatus and method of controlling a stepper motor may be effectively exploited in linear stepper motors. Thus, for example, when applied to linear stepper motors with minimal friction, e.g. having air floating bearings, the present invention provides the maximal increase of dynamic parameters such as velocity and acceleration.

I claim:

1. A method for controlling a stepper motor having a driven rotor comprising the steps of:

initiating motor coils commutation with a predetermined initial phase offset;

gradually varying phase offset from the initial value up to a maximal value and repeatedly sampling rotor position and rotor velocity for different phase offsets;

determining experimentally the optimal phase offset for a given velocity defined as the phase offset providing the maximum rotor velocity at a gradual change of phase;

commutating motor coils with the optimal phase offset.

2. The method of claim 1 wherein the initial phase offset is constant and is defined experimentally as the phase offset providing the maximal steady-state velocity when the coils are commutated according to a rotor position.

3. The method of claim 1 wherein the initial phase offset is defined as two half-steps.

4. The method of claim 1 wherein the optimal phase offset is defined depending on voltage.

5. The method of claim 1 wherein the optimal phase offset is defined as 5 half steps.

6. The method of claim 1 wherein the motor coils are commutated with a constant frequency.

7. The method of claim 1 wherein the motor is accelerated by increasing the phase offset when the velocity increases.

8. The method of claim 1 wherein the motor is decelerated by setting a zero phase offset to energize the current coils.

9. The method of claim 1 wherein the motor is decelerated using a relay zero-overshoot response along the optimal deceleration curve.

10. A method for controlling a stepper motor having a driven rotor comprising the steps of:

initiating motor coils commutation with a predetermined initial phase offset;

repeatedly sampling rotor velocity;

starting from a predetermined velocity, increasing phase offset up to a predetermined optimal value defined as the phase offset providing the maximum rotor velocity at a gradual change of phase;

commutating motor coils with the optimal phase offset.

11. The method according to claim 10 wherein the phase offset is increased step-wise.

12. The method according to claim 10 wherein the phase offset is increased gradually.

13. The method according to claim 10 further comprising a step of deceleration by commutating coils with zero phase offset.

14. The method according to claim 10 wherein the deceleration is performed in relay zero-overshoot response mode along the optimal deceleration curve defined as the curve obtained by integrating the velocity from maximal value up to zero value when the motor not unloaded.

15. The method according to claim 10 wherein the power supply is increased as the frequency grows.

16. The method according to claim 10 wherein for different power supplies different optimal phase offsets are determined.

17. An apparatus for controlling a stepper motor having a driven rotor comprising:

a means for commutating the motor coils with a predetermined phase offset;

a means for gradually varying phase offset from the initial value up to the maximal value;

a means for sampling rotor position and rotor velocity for different phase offsets values;

a means for determining experimentally the optimal phase offset for a given velocity defined as the phase offset providing the maximum velocity;

a means for adjusting the phase offset to the determined optimal phase offset.

18. The apparatus of claim 17 wherein the means for adjusting the phase offset comprises the means for:

determining rotor velocity;

comparing the rotor velocity with a predetermined velocity; and increasing the phase offset if the rotor velocity is equal or above the predetermined velocity.

19. The apparatus of claim 17 further comprising a means for varying current in the motor coils.

20. The apparatus of claim 17 further comprising a means for varying the power supply.

21. The apparatus of claim 17 further comprising a means for varying the frequency of commutation.

22. The apparatus of claim 17 wherein the stepper motor is a linear stepper motor.

* * * * *